United States Patent
Santoso et al.

(10) Patent No.: US 7,778,767 B2
(45) Date of Patent: Aug. 17, 2010

(54) COLD START EMISSION STRATEGY FOR HYBRID VEHICLES

(75) Inventors: Halim G Santoso, Novi, MI (US); Frank Ament, Troy, MI (US)

(73) Assignee: GM Global Technology Operations, Inc.

( * ) Notice: Subject to any disclaimer, the term of this patent is extended or adjusted under 35 U.S.C. 154(b) by 354 days.

(21) Appl. No.: 11/950,686

(22) Filed: Dec. 5, 2007

(65) Prior Publication Data
US 2009/0150059 A1 Jun. 11, 2009

(51) Int. Cl.
*F02D 45/00* (2006.01)
*F02D 41/06* (2006.01)

(52) U.S. Cl. .................... 701/113; 123/179.16
(58) Field of Classification Search .......... 701/113; 123/481, 179.16
See application file for complete search history.

(56) References Cited

U.S. PATENT DOCUMENTS

| | | | |
|---|---|---|---|
| 5,323,868 A * | 6/1994 | Kawashima | 903/903 |
| 6,657,315 B1 * | 12/2003 | Peters et al. | 290/40 C |
| 6,769,400 B1 * | 8/2004 | Ament | 123/399 |
| 6,772,724 B2 * | 8/2004 | Glugla et al. | 123/179.5 |
| 6,856,034 B2 * | 2/2005 | Peters et al. | 290/40 C |
| 6,915,869 B2 * | 7/2005 | Botti et al. | 180/65.245 |
| 6,931,839 B2 * | 8/2005 | Foster | 60/284 |
| 7,121,084 B2 * | 10/2006 | Miyashita | 60/285 |
| 2004/0144363 A1 * | 7/2004 | Ament | 123/399 |
| 2005/0034451 A1 * | 2/2005 | Miyashita | 60/300 |
| 2007/0204830 A1 * | 9/2007 | Andri | 123/198 F |
| 2008/0066457 A1 * | 3/2008 | Kim | 60/286 |
| 2008/0109125 A1 * | 5/2008 | Hahn | 701/22 |
| 2008/0202095 A1 * | 8/2008 | Granqvist | 60/274 |
| 2008/0282673 A1 * | 11/2008 | Gonze et al. | 60/284 |
| 2008/0282686 A1 * | 11/2008 | Gonze et al. | 60/300 |
| 2009/0199560 A1 * | 8/2009 | Maier et al. | 60/700 |
| 2009/0256513 A1 * | 10/2009 | Ando et al. | 318/478 |

* cited by examiner

*Primary Examiner*—Stephen K Cronin
*Assistant Examiner*—Arnold Castro

(57) ABSTRACT

An engine control module includes an engine starting module that communicates with an electric motor to operate an internal combustion engine including M fuel injectors and that determines whether manifold pressure is below a manifold pressure threshold. A warming module communicates with the M fuel injectors to inject fuel into N of M the fuel injectors when the manifold pressure is less than the manifold pressure threshold. N and M are integers and N is less than M.

18 Claims, 4 Drawing Sheets

COLD START EMISSION STRATEGY FOR HYBRID VEHICLES

FIELD

The present invention relates to control systems for hybrid vehicles, and more particularly to a system and method for starting an internal combustion engine in a hybrid vehicle.

BACKGROUND

The statements in this section merely provide background information related to the present disclosure and may not constitute prior art.

When an internal combustion engine is initially started, the engine and exhaust system are cold. Further, the intake manifold absolute pressure (MAP) is near atmospheric pressure because the engine is initially turning at a very low rate. The low temperature and high pressure make it difficult for fuel to vaporize in the cylinders. Incompletely vaporized fuel is not completely combusted. The portion of fuel that is not completely combusted at start-up and the period shortly after start-up creates an exhaust mixture that is fuel-rich. The fuel-rich mixture increases hydrocarbon and carbon monoxide levels in the exhaust.

Vehicles including an internal combustion engine may also include a catalytic converter to treat exhaust. The catalytic converter catalyzes the oxidation of hydrocarbon molecules and carbon monoxide molecules as well as the reduction of nitrogen oxides emitted in the vehicle exhaust. The catalytic converter does not efficiently control emissions at start-up because: 1) a higher fraction of fuel remains unburned and is subsequently exhausted, and 2) the catalyst has not reached an appropriate operating temperature.

The catalytic converter must reach an operating temperature referred to as the light-off temperature to operate efficiently. The catalytic converter reaches light-off temperature after the engine and exhaust system have been adequately heated from engine operation. The period of engine operation required to heat the catalyst provides for sufficient engine RPM to provide a low MAP. The combination of a low MAP and increased operating temperature allows the fuel to vaporize adequately, resulting in more complete combustion of fuel.

Strategies have been employed to reduce exhaust emissions and increase catalytic converter performance at start-up. Such strategies include increasing engine speed at idle, retarding ignition timing, reducing delivered fuel, and adding a secondary air pump to the exhaust stream that supplies the catalyst with oxygen to carry out the oxidation reaction.

SUMMARY

An engine control module includes an engine starting module that communicates with an electric motor to operate an internal combustion engine including M fuel injectors and that determines whether manifold pressure is below a manifold pressure threshold. A warming module communicates with the M fuel injectors to inject fuel into N of M the fuel injectors when the manifold pressure is less than the manifold pressure threshold. N and M are integers and N is less than M.

BRIEF DESCRIPTION OF THE DRAWINGS

The drawings described herein are for illustration purposes only and are not intended to limit the scope of the present disclosure in any way.

DETAILED DESCRIPTION

Figure 1:
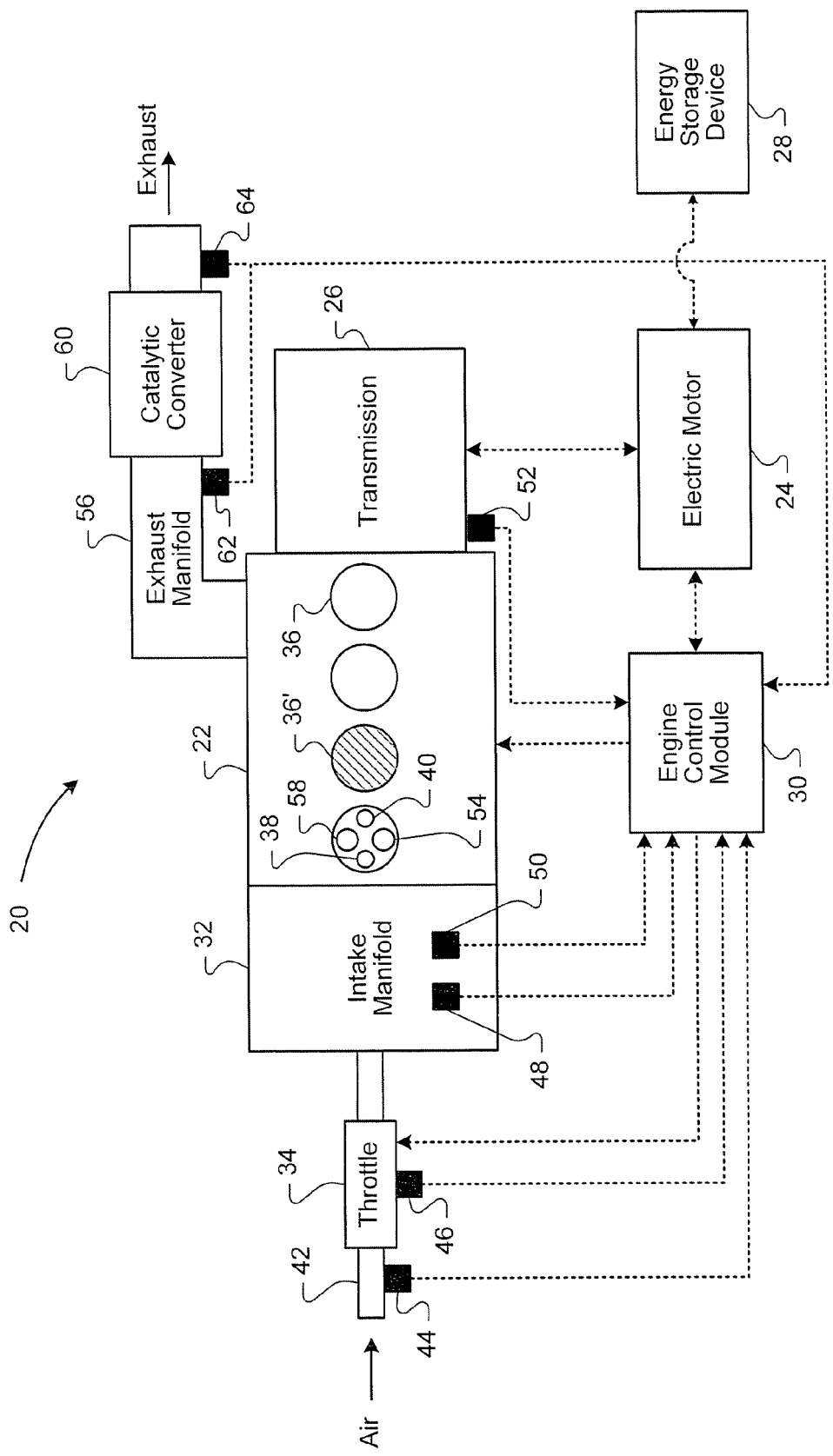
FIG. 1 is a functional block diagram of a hybrid vehicle system according to the present disclosure.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Typically, hydrocarbon (HC) and carbon monoxide (CO) exhaust emissions are high when an internal combustion engine is initially started. A hybrid cold start system according to the present disclosure may reduce emission levels at start-up. The system may involve operating a combustion engine with an electric motor during start-up to reduce manifold pressure. The reduced manifold pressure, along with a modification of fuel injection and spark timing, function to reduce emissions and bring a catalytic converter to an efficient operating temperature without a secondary air pump.

Referring now to FIG. 1, a hybrid vehicle system 20 includes a combustion engine 22 and an electric motor/generator 24 (hereinafter, "electric motor") that selectively drive a transmission 26. Drive torque may be transmitted from the engine 22 and/or electric motor 24 to the transmission 26 through a coupling device (not shown). In a first mode, the electric motor 24 drives the engine 22 using energy from the energy storage device (ESD) 28. In a second mode, the engine 22 drives the electric motor 24 to generate power used to recharge the ESD 28. The ESD 28 may include, but is not limited to, a battery or a super-capacitor. An engine control module 30 may control the operation of the engine 22, electric motor 24, and transmission 26 in the first and second mode.

The engine 22 and electric motor 24 may be coupled via a belt-alternator-starter (BAS) system (not shown). In a BAS system, the electric motor 24 is coupled to the engine 22 through a belt and pulley system. Alternatively, the BAS system may be replaced with a flywheel-alternator-starter (FAS) system (not shown) that includes an electric motor (not shown) operably disposed between the engine 22 and the transmission 26.

Air is drawn into an intake manifold 32 through a throttle 34. The throttle 34 regulates air flow into the intake manifold 32. Air within the intake manifold 32 is distributed into cylinders 36. The engine control module 30 may deactivate one or more selected cylinders 36' during engine operation. The selected cylinder 36' is deactivated when the engine control module 30 does not signal the corresponding fuel injector 38 to inject fuel into the selected cylinder 36'. A cylinder is active when the engine control module 30 signals the corresponding fuel injector 38 to inject fuel into the cylinder 36. Each cylinder 36 includes a spark plug 40 for igniting the air/fuel mixture. Although FIG. 1 depicts four cylinders 36, it is appreciated that the engine 22 may include additional or fewer cylinders 36. For example, engines having 5, 6, 8, 10, 12 and 16 cylinders are contemplated. The engine 22 may also provide for an active fuel management system (not shown).

The engine control module 30 communicates with components of the vehicle system 20, such as the engine 22 and associated sensors and controls as discussed herein. The engine control module 30 may implement the hybrid cold start system of the present disclosure.

Air is passed from an inlet 42 through a mass airflow sensor 44, such as a mass airflow meter. The sensor 44 generates a mass airflow (MAF) signal that indicates a rate of air flowing through the sensor 44. Inlet air is metered to the engine 22 via the throttle 34. For example only, the throttle 34 may be a conventional butterfly valve that rotates within the inlet air path 42. The throttle 34 is adjusted based on an operator and/or controller commanded engine operating point. The position of the throttle 34 is sensed by a throttle position sensor 46 that generates a throttle position (TPS) signal. The throttle position sensor 46 may be a rotational potentiometer.

A manifold pressure sensor 48 is positioned in the engine intake manifold 32 between the throttle 34 and the engine 22. The manifold pressure sensor 48 generates a manifold absolute air pressure (MAP) signal. A manifold air temperature sensor 50, that generates a manifold air temperature (MAT) signal based on intake air temperature, may also be located in the engine intake manifold 32.

An engine crankshaft (not shown) rotates at engine speed or a rate that is proportional to the engine speed. A crankshaft sensor 52 senses the position of the crankshaft and generates a crankshaft position (CSP) signal. The CSP signal may be related to the rotational speed of the crankshaft and cylinder events. The crankshaft sensor 52 may be a conventional variable reluctance sensor. Skilled artisans will appreciate that there are other suitable methods of sensing engine speed and cylinder events.

An intake valve 54 selectively opens and closes to enable air to enter the cylinder 36. A camshaft (not shown) regulates intake valve position. A piston (not shown) compresses the air/fuel mixture within the cylinder 36. The engine control module 30 controls the spark plug 40 to initiate combustion of the fuel/air mixture, driving the piston in the cylinder 36. The piston drives a crankshaft (not shown) to produce drive torque. Combustion exhaust within the cylinder 36 is forced out through an exhaust manifold 56 when an exhaust valve 58 is in an open position. A camshaft (not shown) regulates exhaust valve position. Although single intake and exhaust valves 54, 58 are illustrated, it can be appreciated that the engine 22 may include multiple intake and exhaust valves 54, 58 per cylinder 36.

A catalytic converter 60 treats exhaust to reduce emission levels. The catalytic converter 60 controls emissions by increasing the rate of oxidization of HC and CO and increasing the rate of reduction of nitrogen oxides (NOx). The catalytic converter 60 requires air or oxygen to enable oxidation. Adding air into the exhaust stream of the catalytic converter 60 increases the rate of HC and CO oxidization. The increased rate of oxidization quickly heats the catalytic converter 60, significantly benefiting the conversion of HC, CO, and NOx. Inlet and outlet oxygen sensors 62, 64 may generate oxygen signals that are used by the engine control module 30 to determine the efficiency of the catalytic converter 60.

Figure 2:
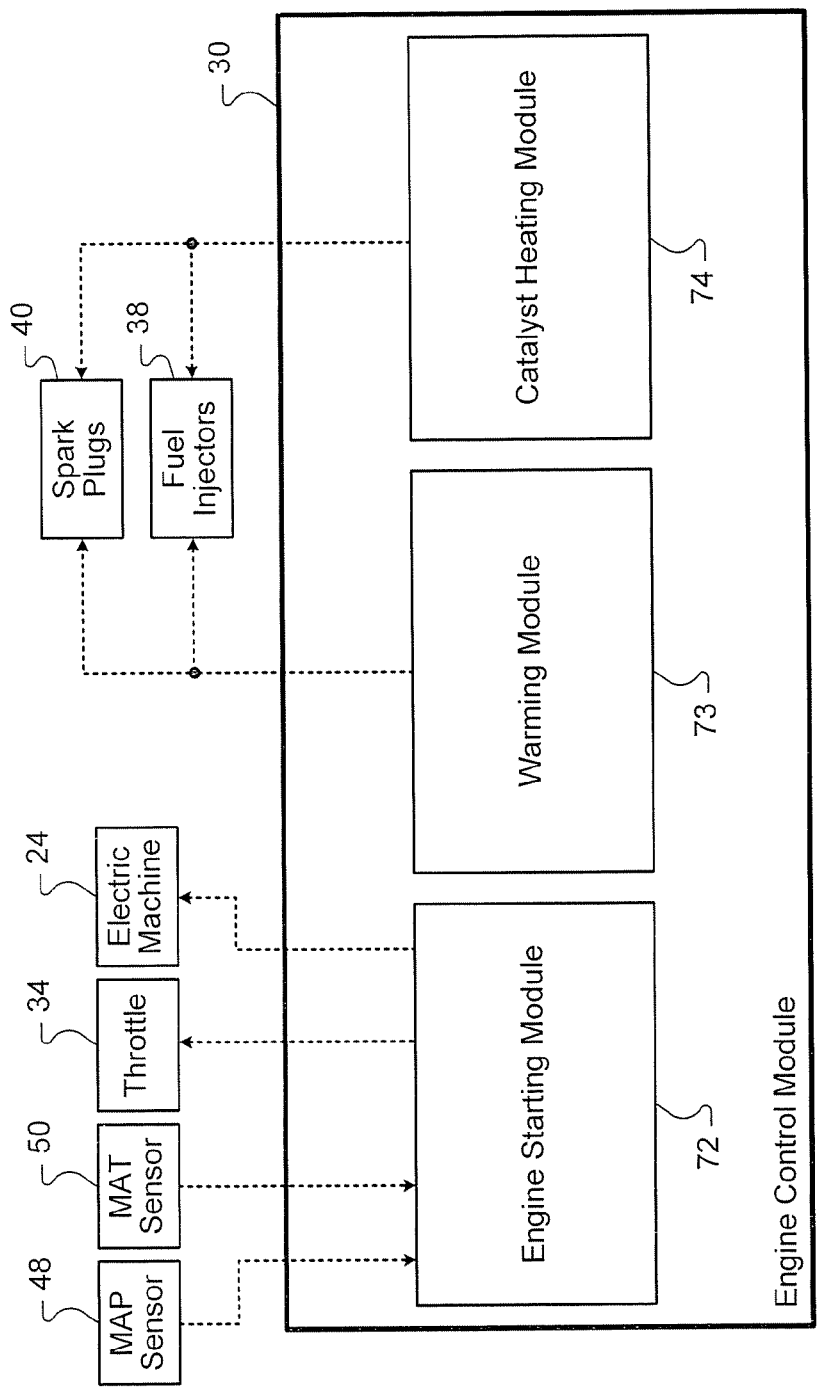
FIG. 2 is a functional block diagram of an engine control module according to the present disclosure.

Referring to FIG. 2, the engine control module 30 includes an engine starting module 72, a warming module 73, and a catalyst heating module 74. The engine control module 30 receives input signals from the hybrid vehicle system 20 including, but not limited to, the MAF, TPS, MAP, MAT, CSP, oxygen, and electric motor signals (hereinafter, "vehicle system signals"). The engine control module 30 processes the vehicle system signals, and generates timed engine control commands that are output to the vehicle system 20. For example, engine control commands may control the electric motor 24, throttle 34, fuel injectors 38, spark plugs 40, and the mode of operation of the hybrid vehicle system 20.

The engine starting module 72 commands the electric motor 24 to spin the engine 22 up to a predetermined range of RPM to reduce manifold pressure. For example only, a suitable range may be from 600-900 RPM, although other ranges are anticipated. While the engine 22 is being spun to the predetermined RPM, the engine starting module 72 signals the throttle 34 to stay closed to ensure that low manifold pressure can be achieved as soon as possible.

The engine starting module 72 may wait for low manifold pressure based on a predetermined period of time. Alternatively, the engine starting module 72 may determine that low manifold pressure is reached based on vehicle system signals (e.g. MAP signals). For example only, low manifold pressure may be approximately 40 kPa, although other pressures are anticipated. The engine starting module 72 controls the throttle to maintain the constant low manifold pressure while the engine 22 is spinning at the predetermined RPM. Low manifold pressure may be achieved in a short period of time (e.g. less than one second).

The warming module 73 electronically controls the fuel injectors 38 to inject fuel into the active cylinders 36. The warming module 73 chooses the deactivated cylinders 36' to help spatial mixing of the exhaust gas in the exhaust manifold 56. For example, cylinder number 2 or 3 may be deactivated in a four cylinder engine. The warming module 73 signals the fuel injectors 38 to target a slightly lean air/fuel mixture immediately, which is feasible in a hybrid system because the vehicle is not solely relying on the engine 22 to produce torque. The low manifold pressure assists the mixture of air and fuel, and therefore reduces the amount of fuel required to ensure robust combustion inside the cylinder 36.

The warming module 73 electronically controls the spark plugs 40 of the active cylinders 36 to spark the air/fuel mixture 84. The spark may be maintained at top dead center to produce hotter exhaust gas. The warming module 73 fires the active cylinders 36 until the cylinder walls and exhaust system (i.e., exhaust manifold, catalytic converter) are warm. The warming module 73 may continue firing the active cylinders 36 for a predetermined period of time to warm the exhaust system. Alternatively, the warming module 73 may determine the exhaust system is warm based on vehicle system signals (e.g. oxygen signals) that are indicative of catalytic converter 60 performance. The cylinder walls and exhaust system may be warmed in a short period of time (e.g. approximately one second).

The catalyst heating module 74 electronically controls the fuel injectors 38 to enrich the air/fuel mixture. The enrichment of the air/fuel mixture provides for more exhaust gas, which contains CO. The catalyst heating module 74 retards the spark timing to ensure high gas temperature in the exhaust system. The presence of CO at an elevated gas temperature and oxygen from the deactivated cylinder 36' generate heat through the CO oxidation process that occurs in the exhaust system. The catalyst heating module 74 maintains enriched fueling and spark retarding until the catalyst volume is fully active. The catalyst heating module 74 may determine that the catalyst volume is fully active based on a predetermined period of time or based on feedback from vehicle system signals (e.g. oxygen signals). The catalyst may become fully active in a short period of time (e.g. approximately two seconds). The catalyst heating module 74 activates the deactivated cylinder 36' by enabling the corresponding fuel injector 38.

Figure 3:
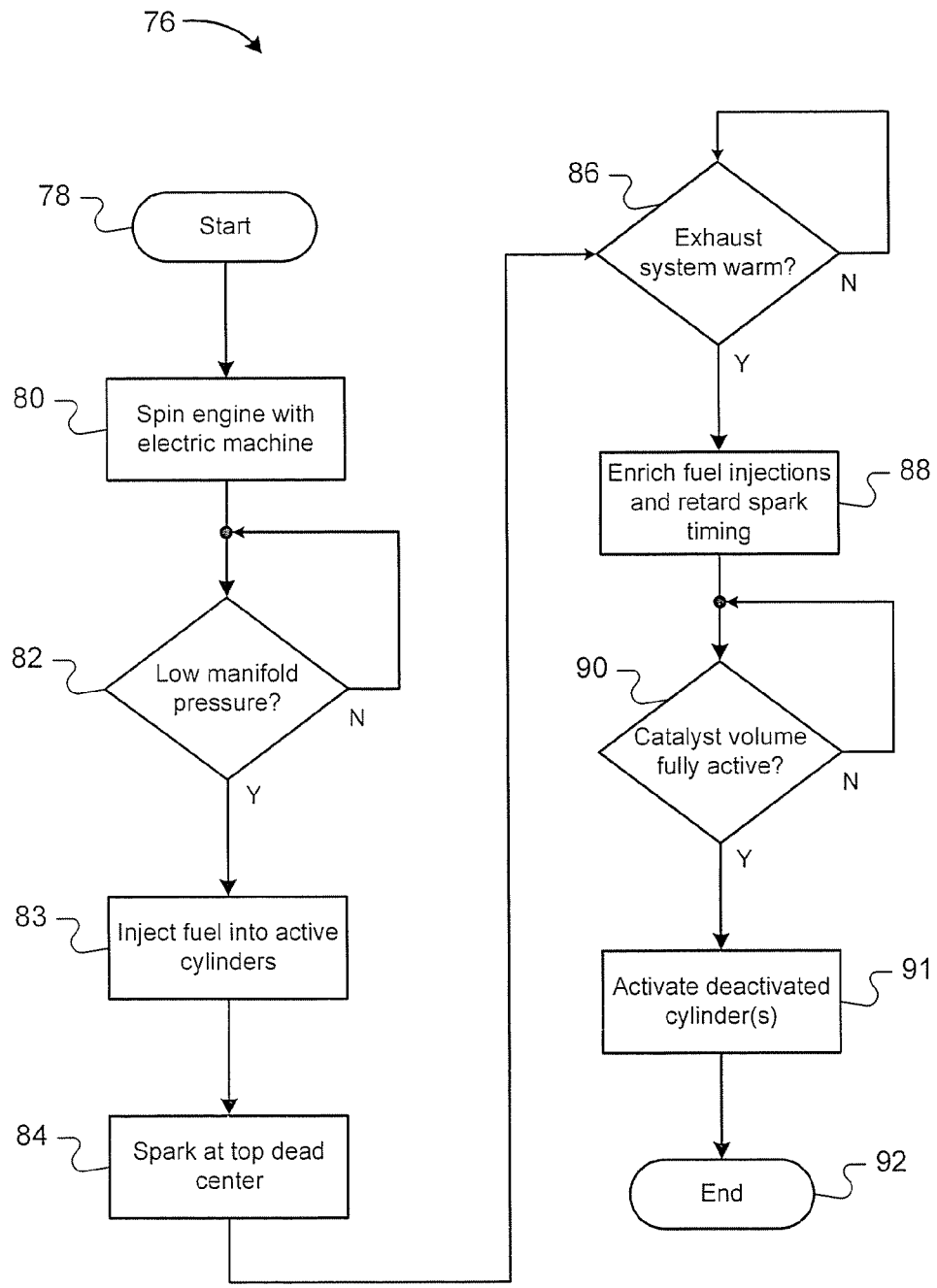
FIG. 3 is a flow diagram that illustrates the steps of a hybrid cold start method according to the present disclosure.

Referring to FIG. 3, a hybrid cold start method 76 starts in step 78. In step 80, the engine starting module 72 commands the electric motor 24 to spin the engine 22 up to the predetermined range of RPM. In step 82, the engine starting module 72 determines whether a low manifold pressure has been achieved. If false, the method repeats step 82. If true, the method continues to step 83. In step 83, the warming module 73 controls the fuel injectors 38 to inject fuel into the active cylinders 36. In step 84, the warming module 73 controls the spark plugs 40 to spark at top dead center. In step 86, the warming module 73 determines whether the exhaust system is warm. If false, the method repeats step 86. If true, the method continues to step 88. In step 88, the catalyst heating module 74 enriches the fuel injections and retards spark plug timing. In step 90, the catalyst heating module 74 determines whether the catalyst volume is fully active. If false, the method repeats step 90. If true, the method continues to step 91. In step 91, the catalyst heating module 74 activates the deactivated cylinders 36'. The hybrid cold start method 76 ends in step 92. Since the catalyst is already hot after the heating method, the HC emission impact of starting the deactivated cylinders 36' will be very small.

Figure 4:
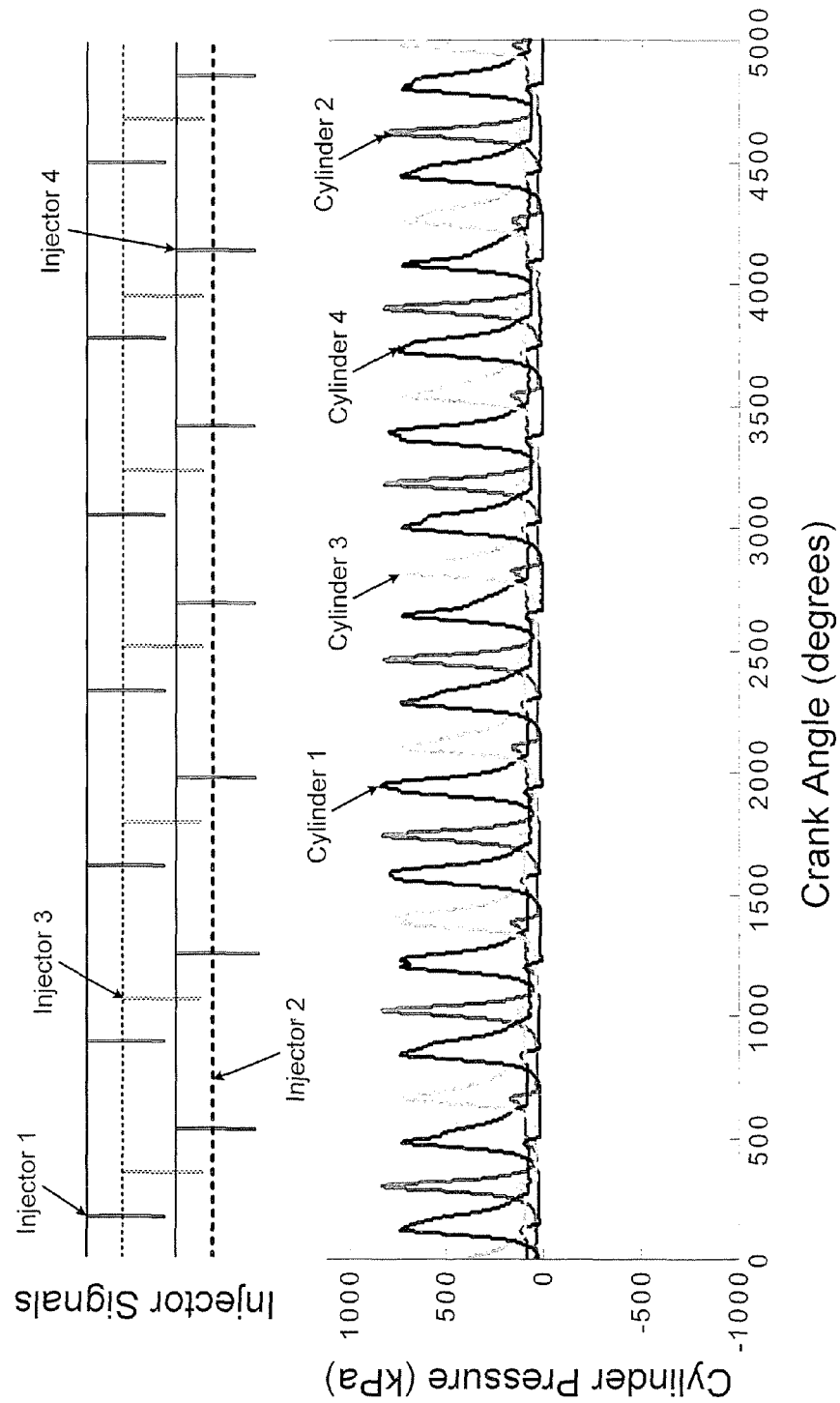
FIG. 4 is a graph of cylinder pressure vs. crank angle for a four cylinder engine operating with the fuel injector of cylinder 2 deactivated according to the present disclosure.

Referring to FIG. 4, a hybrid cold start system is demonstrated in a four cylinder engine operating with the fuel injector of cylinder 2 deactivated. The peak compression pressure is higher in cylinder 2 because it is compressing only air instead of an air/fuel mixture. Pure air has a higher specific heat ratio compared to an air/fuel mixture which leads to higher peak compression pressure. The pressure spike in cylinder 2 is also narrower than in other cylinders because there is no combustion in cylinder 2. Combustion occurs near top dead center in the other cylinders which increases the cylinder pressure during the expansion stroke and causes the pressure trace to remain high for a longer duration. Although the concept is demonstrated with a four cylinder engine, a hybrid cold start system may be employed in engines other than those with only four cylinders. For example only, the process could be employed in a V-6 or V-8 engine. In the case of a V-6 or V-8 engine at least one cylinder per grouped bank would not be fueled, or would be provided a very lean air/fuel mixture to oxidize the rich exhaust products from the adjacent cylinders.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. An engine control module, comprising:
    an engine starting module that communicates with an electric motor to operate an internal combustion engine including M fuel injectors, and that determines whether manifold pressure is below a manifold pressure threshold; and
    a warming module that communicates with said M fuel injectors to inject fuel with only N of said M fuel injectors when said manifold pressure is less than said manifold pressure threshold,
    wherein N and M are integers greater than zero and N is less than M.

2. The engine control module of claim 1 wherein said warming module communicates with a plurality of spark plugs and determines whether a temperature of an exhaust system and said internal combustion engine is greater than or equal to a temperature threshold.

3. The engine control module of claim 1 wherein said electric motor operates said internal combustion engine between 600 and 900 RPM.

4. The engine control module of claim 1 wherein said engine starting module signals a throttle to stay closed while said electric motor operates said internal combustion engine.

5. The engine control module of claim 1 wherein said engine starting module determines whether said manifold pressure is less than or equal to said manifold pressure threshold based on at least one of a period of time and a manifold air pressure signal.

6. The engine control module of claim 2 wherein said warming module determines whether said temperature exceeds said temperature threshold based on at least one of a period of time and oxygen signals.

7. The engine control module of claim 2 wherein said warming module communicates with said plurality of spark plugs to spark at top dead center, and communicates with said N fuel injectors to target a lean air/fuel mixture.

8. The engine control module of claim 2 further comprising a catalyst heating module that communicates with said N fuel injectors to enrich fueling, that communicates with said plurality of spark plugs to retard spark timing, that determines that a catalyst is active after said exhaust system and said engine temperature exceeds said temperature threshold, and that commands said M fuel injectors to inject fuel after said catalyst is active.

9. The engine control module of claim 8 wherein said catalyst heating module determines that said catalyst is active based on at least one of a period of time and oxygen signals.

10. A method, comprising:
    communicating with an electric motor to operate an internal combustion engine including M fuel injectors;
    determining whether manifold pressure is below a manifold pressure threshold; and
    communicating with said M fuel injectors to inject fuel with only N of said M fuel injectors when said manifold pressure is less than said manifold pressure threshold,
    wherein N and M are integers greater than zero and N is less than M.

11. The method of claim 10 further comprising:
    communicating with a plurality of spark plugs; and
    determining whether a temperature of an exhaust system and said internal combustion engine is greater than or equal to a temperature threshold.

12. The method of claim 10 wherein said electric motor operates said internal combustion engine between 600 and 900 RPM.

13. The method of claim 10 further comprising signaling a throttle to stay closed while said electric motor operates said internal combustion engine.

14. The method of claim 10 wherein further comprising determining whether said manifold pressure is less than or equal to said manifold pressure threshold based on at least one of a period of time and a manifold air pressure signal.

15. The method of claim 11 further comprising determining whether said temperature exceeds said temperature threshold based on at least one of a period of time and oxygen signals.

16. The method of claim 11 further comprising:
    communicating with said plurality of spark plugs to spark at top dead center; and communicating with said N fuel injectors to target a lean air/fuel mixture.

17. The method of claim 11 further comprising:
communicating with said N fuel injectors to enrich fueling;
communicating with said plurality of spark plugs to retard spark timing;
determining that a catalyst is active after said exhaust system and said engine temperature exceeds said temperature threshold; and
commanding said M fuel injectors to inject fuel after said catalyst is active.

18. The method of claim 17 further comprising determining that said catalyst is active based on at least one of a period of time and oxygen signals.

* * * * *